United States Patent
Jeppesen et al.

(10) Patent No.: US 8,171,262 B2
(45) Date of Patent: *May 1, 2012

(54) METHOD AND APPARATUS FOR CLEARING HAZARDS USING JUMP INSTRUCTIONS

(75) Inventors: Niels Gram Jeppesen, Gentofte (DK); G. Michael Uhler, Menlo Park, CA (US)

(73) Assignee: MIPS Technology, Inc., Sunnyvale, CA (US)

( * ) Notice: Subject to any disclaimer, the term of this patent is extended or adjusted under 35 U.S.C. 154(b) by 689 days.

This patent is subject to a terminal disclaimer.

(21) Appl. No.: 11/284,069

(22) Filed: Nov. 21, 2005

(65) Prior Publication Data

US 2006/0101255 A1    May 11, 2006

Related U.S. Application Data (63) Continuation of application No. 10/238,993, filed on Sep. 6, 2002, now Pat. No. 7,000,095.

(51) Int. Cl.
G06F 9/30 (2006.01)
G06F 9/40 (2006.01)
G06F 15/00 (2006.01)

(52) U.S. Cl. ........................................ 712/216; 712/214
(58) Field of Classification Search .................... 712/23, 712/219, 216
See application file for complete search history.

(56) References Cited

U.S. PATENT DOCUMENTS

| | | |
|---|---|---|
| 4,974,155 A | 11/1990 | Dulong et al. |
| 5,228,131 A | 7/1993 | Ueda et al. |
| 5,537,560 A | 7/1996 | Boggs et al. |
| 5,579,498 A | 11/1996 | Ooi |
| 5,761,473 A | 6/1998 | Kahle et al. |
| 5,805,878 A | 9/1998 | Rahman et al. |

(Continued)

FOREIGN PATENT DOCUMENTS

EP    0352103    1/1990

(Continued)

OTHER PUBLICATIONS

IBM, PowerPC Microprocessor Family: The Programming Environments for 32 Bit Microprocessors, Feb. 21, 2000, Section 4.3.2, 5.1.5.2.2, p. 8-94 (isync).

(Continued)

*Primary Examiner* — Eddie P Chan
*Assistant Examiner* — George D Giroux
(74) *Attorney, Agent, or Firm* — Sterne, Kessler, Goldstein & Fox, P.L.L.C.

(57) ABSTRACT

A method and apparatus for overlaying hazard clearing with a jump instruction within a pipeline microprocessor is described. The apparatus includes hazard logic to detect when a jump instruction specifies that hazards are to be cleared as part of a jump operation. If hazards are to be cleared, the hazard logic disables branch prediction for the jump instruction, thereby causing the jump instruction to proceed down the pipeline until it is finally resolved, and flushing the pipeline behind the jump instruction. Disabling of branch prediction for the jump instruction effectively clears all execution and/or instruction hazards that preceded the jump instruction. Alternatively, hazard logic causes issue control logic to stall the jump instruction for n-cycles until all hazards are cleared. State tracking logic may be provided to determine whether any instructions are executing in the pipeline that create hazards. If so, hazard logic performs normally. If not, state tracking logic disables the effect of the hazard logic.

51 Claims, 5 Drawing Sheets

U.S. PATENT DOCUMENTS

| | | | |
|---|---|---|---|
| 5,809,275 | A | 9/1998 | Lesartre |
| 5,809,294 | A | 9/1998 | Ando |
| 5,809,320 | A | 9/1998 | Jain et al. |
| 5,848,269 | A | 12/1998 | Hara |
| 5,850,552 | A | 12/1998 | Odani et al. |
| 5,889,974 | A | 3/1999 | Harriman et al. |
| 6,216,174 | B1 * | 4/2001 | Scott et al. ............ 713/375 |
| 6,260,189 | B1 | 7/2001 | Batten et al. |
| 6,317,821 | B1 | 11/2001 | Batten et al. |
| 6,606,702 | B1 * | 8/2003 | Guthrie et al. ........ 712/218 |
| 6,643,767 | B1 | 11/2003 | Sato |
| 6,754,813 | B1 | 6/2004 | Nakada |
| 2001/0047511 | A1 * | 11/2001 | Itou et al. ................ 717/6 |
| 2002/0016903 | A1 * | 2/2002 | Nguyen et al. ........ 712/23 |
| 2002/0069348 | A1 | 6/2002 | Roth et al. |

FOREIGN PATENT DOCUMENTS

| | | |
|---|---|---|
| EP | 0649085 | 4/1995 |
| WO | WO0070483 | 11/2000 |

OTHER PUBLICATIONS

Diefendorff et al. "Organization of the Motorola 88110 Superscalar RISC Microprocessor." IEEE Micro, US, IEEE Inc. New York, vol. 12, No. 2, Apr. 1, 1992. pp. 40-63. XP000266192 ISSN: 0272-1732 p. 46-47.

Alpha Architecture Handbook Vs. Oct. 3, 1996.

* cited by examiner

EXECUTION HAZARDS / 400

| Producer → | Consumer | Hazard On |
|---|---|---|
| TLBWR,TLBWI → | TLBP,TLBR | TLB entry |
| | Load/store using new TLB entry | TLB entry |
| MTC0 → | Load/store affect by new state | $EntryHi_{ASID}$<br>WatchHi<br>WatchLo |
| MTC0 → | Coprocessor instruction execution depends on the new value of $Status_{CU}$ | $Status_{CU}$ |
| MTC0 → | ERET | Status<br>EPC<br>DEPC<br>ErrorEPC |
| MTC0,EI,DI → | Interrupted Instruction | $Status_{IE}$ |
| MTC0 → | Interrupted Instruction | $Cause_{IP}$ |
| TLBR → | MFC0 | EntryHi<br>EntryLo0<br>EntryLo1<br>PageMask |
| TLBP → | MFC0 | Index |
| MTC0 → | TLBR<br>TLBWI<br>TLBWR | EntryHi |
| MTC0 → | TLBP<br>Load or Store Instruction | $EntryHi_{ASID}$ |
| MTC0 → | RDPGPR<br>WRPGPR | $SRSCtl_{PSS}$ |

Figure 5

INSTRUCTION HAZARDS / 500

| Producer → | Consumer | Hazard On |
|---|---|---|
| TLBWR,TLBWI → | Instruction fetch using new TLB entry | TLB entry |
| MTC0 → | Instruction fetch seeing the new value (including a change to ERL followed by an instruction fetch from the useg segment) | Status |
| MTC0 → | Instruction fetch seeing the new value | $EntryHi_{ASID}$<br>WatchHi<br>WatchLo |
| Instruction stream writes → | Instruction fetch seeing the new instruction stream | Cache entries |

METHOD AND APPARATUS FOR CLEARING HAZARDS USING JUMP INSTRUCTIONS

CROSS REFERENCE TO RELATED APPLICATIONS

This application is a Continuation of U.S. patent application Ser. No. 10/238,993 filed Sep. 6, 2002 now U.S. Pat. No. 7,000,095 entitled "METHOD AND APPARATUS FOR CLEARING HAZARDS USING JUMP INSTRUCTIONS" assigned to MIPS Technologies, Inc.

FIELD OF THE INVENTION

This invention relates in general to the field of computer architecture, and more specifically to a method and apparatus for managing instruction hazards within a pipeline architecture by overlaying hazard clearing with jump instructions.

BACKGROUND OF THE INVENTION

Figure 1:
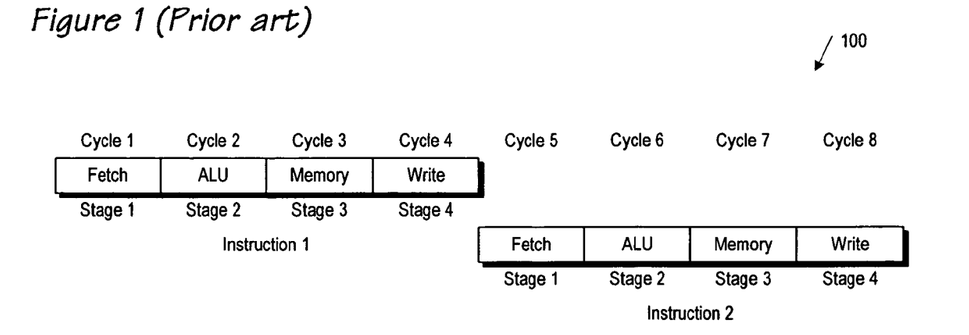
FIG. 1 is prior art block diagram of a four stage pipeline microprocessor.

Referring to FIG. 1, a block diagram is shown of a four stage Single-Completion Instruction Pipeline of an early microprocessor 100. The pipeline stages include: 1) Fetch; 2) Arithmetic operation (ALU); 3) Memory access; and 4) Write back. In operation, the microprocessor fetches an instruction for execution in cycle 1, executes the instruction in cycle 2, performs a read or write to memory in cycle 3, and writes the result of the ALU operation (from cycle 2), or the memory read (from cycle 3), into its register file in cycle 4. If each pipeline stage requires one processor clock to complete its function, then in the four stage pipeline, an instruction requires four clocks to complete execution. In this example, the execution rate of the pipeline is one instruction every four clock cycles.

One skilled in the art of microprocessor design will recognize that one of the problems in the Single-Completion Instruction Pipeline of FIG. 1 is that in any given clock cycle, only one of the pipeline stages is being utilized for instruction execution. For example, during clock cycle 1, the Fetch stage is busy fetching an instruction for execution, but the ALU, Memory and Write stages are essentially idle. An idle processing stage is considered inefficient and therefore undesirable within a processing system.

Figure 2:
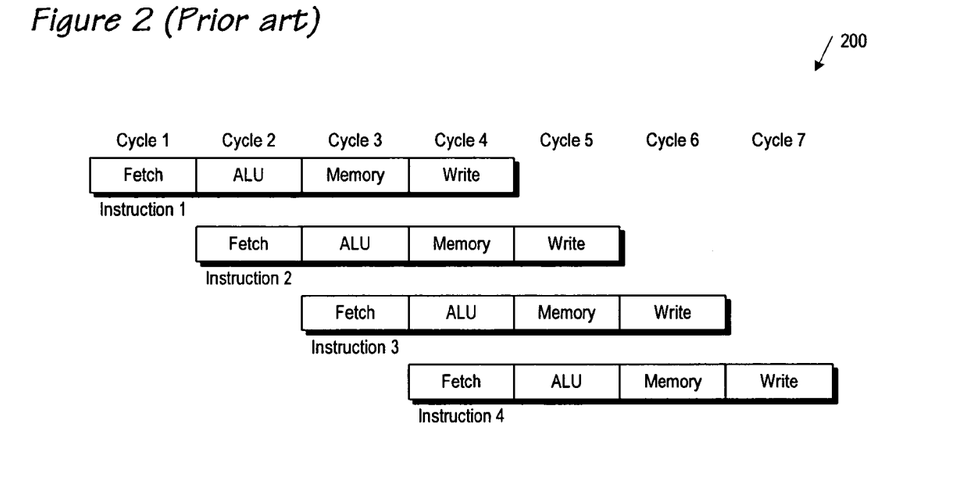
FIG. 2 is a prior art block diagram of a parallel pipeline microprocessor.

A remedy for the idleness described above is shown in FIG. 2, to which attention is now directed. FIG. 2 includes a four stage pipeline microprocessor 200 similar to the one shown in FIG. 1. However, in the microprocessor 200, rather than waiting for an instruction to be completed before the next instruction can be fetched (four clock cycles), a new instruction is fetched each clock cycle. In this four stage pipeline, four instructions are in the process of executing simultaneously, one at each stage of the pipeline. While it still takes four clock cycles for the first instruction to be completed, a new instruction is completed every clock cycle thereafter. Thus, the idleness illustrated in FIG. 1 above has been removed, and the overall processing efficiency has been improved.

A problem is created however, in the parallel pipeline of FIG. 2, when an instruction depends on the completion or resolution of a previous instruction before it can begin. This problem is illustrated in FIG. 3 to which attention is now directed.

Figure 3:
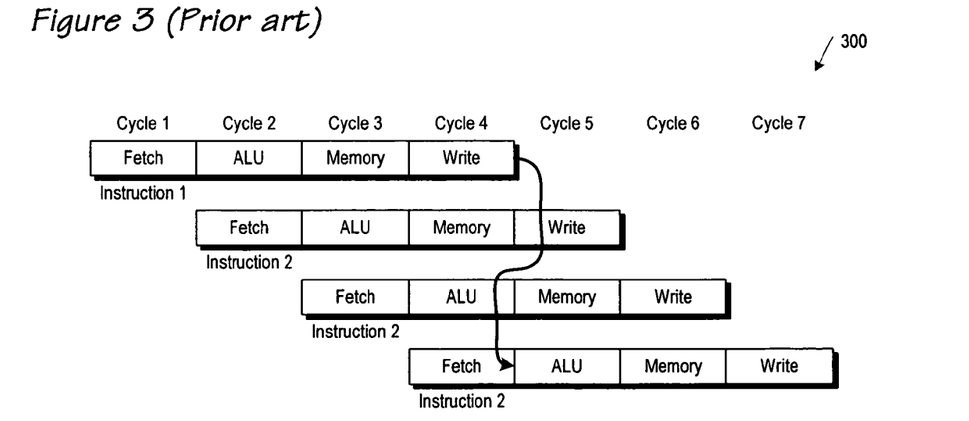
FIG. 3 is a prior art block diagram of a parallel pipeline microprocessor executing an instruction sequence having an instruction hazard.

FIG. 3 illustrates a parallel pipeline microprocessor 300 such as the one shown in FIG. 2. However, in this Figure, Instruction 2 is dependent on the resolution of Instruction 1 before it can begin. For example, presume Instruction 1 is of the form: LOAD REG1, MEM. That is, Instruction 1 causes a value from memory location MEM to be retrieved from memory, and stored within a register REG1 within the microprocessor 300. Now, presume that Instruction 2 is of the form: ADD REG1,2. That is, Instruction 2 adds the contents of the REG1 register to the numeric value 2, and stores the result in the REG1 register. In the four stage pipeline 300, Instruction 1 does not retrieve the contents of memory location MEM until the end of clock cycle 3. And, the retrieved contents of memory location MEM are not stored into the register REG1 until the end of clock cycle 4. If Instruction 2 were allowed to proceed into the ALU stage of the pipeline in clock cycle 3, the contents of the REG1 register, to which the value of 2 is to be added, would not yet be updated with the contents from MEM. Thus, the result of the addition would either be unknown, or at the very least incorrect. In this example, the only way to make sure that Instruction 2 is executed using the correct contents of register REG1 is to hold or stall execution of Instruction 2 by at least two clock cycles.

What is shown in FIG. 3 is just one example of what is known as a pipeline hazard. In general, there are two types of pipeline hazards: 1) execution hazards; and 2) instructions hazards. Execution hazards are hazards created by the execution of one instruction, and seen by the execution of another instruction, such as shown in FIG. 3. Instruction hazards are those created by the execution of one instruction, and seen by the instruction fetch of another instruction. For example, a first instruction might update a TLB entry in a TLB table, and a second instruction would fetch an instruction using the updated TLB entry. If the second instruction attempted to fetch an instruction from the TLB entry prior to the update, it would be fetching an incorrect instruction. In either case, to insure that all instructions execute properly within a pipelined microprocessor, it must be assured that an instruction that depends on the resolution of a previous instruction is either stalled or delayed, at least until the instruction from which it depends completes. The methodology utilized to insure proper execution of dependent instructions is known as hazard protection, or hazard clearing.

Hazard protection is typically performed either in hardware, or in software. When hazard protection is provided in hardware, a portion of the microprocessor is dedicated to tracking each instruction to be executed for the purpose of detecting instruction dependencies. When an instruction dependency is detected, the hardware causes an interlock on the dependent instruction, thereby stalling the dependent instruction, until the instruction from which it depends completes execution. A benefit of designing a microprocessor to incorporate hardware hazard protection is that a software programmer is shielded from the intricacies associated with instruction execution. That is, the programmer does not have to worry about how many stages it takes for a first instruction to be resolved before starting a second dependent instruction. S/he can simply write the instructions in the order desired for execution, and trust that the hazard hardware in the microprocessor will insure proper execution. A downside of providing hazard protection in hardware is that such hardware adds considerable complexity to the microprocessor, and that impacts both the design cost and ultimate cost of the microprocessor. In addition, design changes in the architecture that effect execution order, the number of stages in the pipeline, or execution timing, must be considered in the hazard hardware, thereby making design changes in the hazard hardware necessary. For many types of microprocessors, the additional complexity associated with providing hazard protection in hardware is considered inappropriate. For these microprocessors, hazard protection is typically provided via software.

Software hazard protection places the burden of preventing hazards on the software programmer, or on the designer of the compiler used by the software programmer. To illustrate how a software programmer would resolve the hazard shown in FIG. 3, consider the following program:

```
         LOAD REG1, MEM
         NOP
         NOP
         ADD REG1, 2
```

A programmer, with knowledge of the pipeline structure of the microprocessor 300 understands that Instruction 2 is dependent on the resolution of Instruction 1, and that it will take two additional clock cycles between Instructions 1 and 2 to resolve the dependency. S/he therefore inserts two NOP (no operation) instructions in between Instructions 1 and 2. Alternatively, if the programmer utilized a compiler that was designed specifically for the microprocessor 300, s/he could trust that the compiler would detect the dependency between Instructions 1 and 2, and would insert the necessary number of NOP instructions between the two instructions. From the viewpoint of the microprocessor 300, it is simply fetching an instruction every clock cycle and passing the fetched instructions down the pipeline for execution. The microprocessor 300 has not needed any additional hardware to resolve the hazard, and yet the hazard has been prevented.

A problem with software hazard clearing is that it places the burden of understanding the nuances of instruction execution within a particular microprocessor implementation on either the programmer, or alternatively on the designer of the compiler for the microprocessor. While such a burden is ubiquitous within the field of modern microprocessors, it is nonetheless a significant problem. Not only must a programmer understand the implementation of the processor for which s/he is coding, s/he must also understand how much delay is associated with each instruction upon which other instructions depend. Within a deeply pipelined microprocessor (12 or more stages), the programmer must insert between 1 and 10 NOP's between dependent instructions, depending on how far the dependent instructions are separated within the program, and depending on how far the first instruction must proceed in the pipeline before it is resolved. To accurately code for a deeply pipelined microprocessor, a programmer must be very proficient in the implementation hazards of the processor.

An additional problem with using software hazard clearing is that once a program is developed for a microprocessor, it is unlikely that the program will operate on subsequent generations of the microprocessor without a significant rewrite of the program. For example, if a microprocessor advances from having a five stage pipeline, to having a twelve stage pipeline, it is unlikely that any of the hazard clearing methods used for the five stage pipeline will operate correctly in the twelve stage pipeline. This is true even though the software architectures (i.e., the instructions) of the five and twelve stage pipeline are identical.

What has become apparent to the inventors of the present invention is the need for a hazard clearing mechanism that can be utilized by programmers, or designers of compilers, that can be implemented across multiple generations of a microprocessor architecture, that eliminates the need of rewriting hazard clearing code between processor generations, and that eases the burden on the programmer of understanding the nuances of particular microprocessor hazards.

What is also needed is a method and apparatus that allows a programmer to specify when a hazard should be cleared, without regard to the number of stages between the hazard and the dependent instruction.

Further what is needed is a method and apparatus for hazard clearing that can be utilized in conjunction with hardware hazard tracking.

SUMMARY

The present invention provides a method and apparatus for overlaying hazard clearing with a jump operation.

In one aspect, the present invention provides a jump with hazard barrier instruction executing on a multi-stage pipelined microprocessor. The jump instruction includes an opcode field, a first register field, a second register field, and a hazard barrier hint field. The opcode field specifyies a jump to a target address operation. The first register field specifies a first register that contains a value used to determine the target address. The second register field specifies a second register to contain a value used to determine a return address. The hazard barrier hint field designates that instruction hazards are to be cleared as part of execution of the jump instruction.

In another aspect, the present invention provides a jump with hazard barrier instruction executing on a multi-stage pipelined microprocessor. The jump instruction includes an opcode field, a register field, and a hazard barrier hint field. The opcode field specifies a jump to a target address operation. The register field specifies a first register that contains a value used to determine the target address. The hazard barrier hint field designates that instruction hazards are to be cleared as part of execution of the jump instruction. In this embodiment, the return address register for the return address is implied in the format of the instruction. And, in an alternative embodiment, the value used to determine the return address is stored in a general purpose register 31.

In a further aspect, the present invention provides a jump instruction with hazard clearing executing on a pipeline microprocessor. The instruction includes an opcode field, a register field and a hazard barrier field. The opcode field specifies a jump to a target address operation. The register field specifies a register that contains a value used to determine the target address. The hazard barrier field for designates that instruction hazards are to be cleared as part of execution of the instruction. In one embodiment, the instruction does not contain a field to specify a return address.

In another aspect, the present invention provides a method for providing a jump instruction with hazard clearing. The method includes: providing computer-readable program code describing the jump instruction with hazard clearing. The program code includes: first program code for describing an opcode field, the opcode field specifying a jump to target address operation; second program code for describing a register field, the register field specifying a register that contains a value used to determine a target address; and third program code for describing a hazard barrier hint field, said field designating that instruction hazards are to be cleared as part of execution of the jump instruction. The method further comprises transmitting the computer-readable program code as a computer data signal on a network.

Other features and advantages of the present invention will become apparent upon study of the remaining portions of the specification and drawings.

DETAILED DESCRIPTION

While the below described invention has utility within many different pipelined microprocessors, so that the idea will be better understood, it will be particularly described as it will be embodied within the MIPS32 Architecture by MIPS Technologies, Inc. of Mountain View, Calif. More specifically, the invention adds explicit hazard clearing instructions to the MIPS32 Architecture. The hazard clearing instructions are overlaid on top of existing call and return instructions, while particularly specifying when hazards should be cleared. Execution logic within the microprocessor detects when calls and returns are concerned with hazards and acts to effectively clear the hazards when the concern is noted. The instructions, being part of the architecture of the processor, effect hazard clearing within multiple generations of the architecture, without requiring the programmer to either understand the nuances of the processor with respect to hazards, and without inserting a predetermined number of NOPs.

Before presenting the new hazard clearing instructions, an overview is first provided of the types of hazards that occur within the MIPS32 architecture.

Execution Hazards

Figure 4:
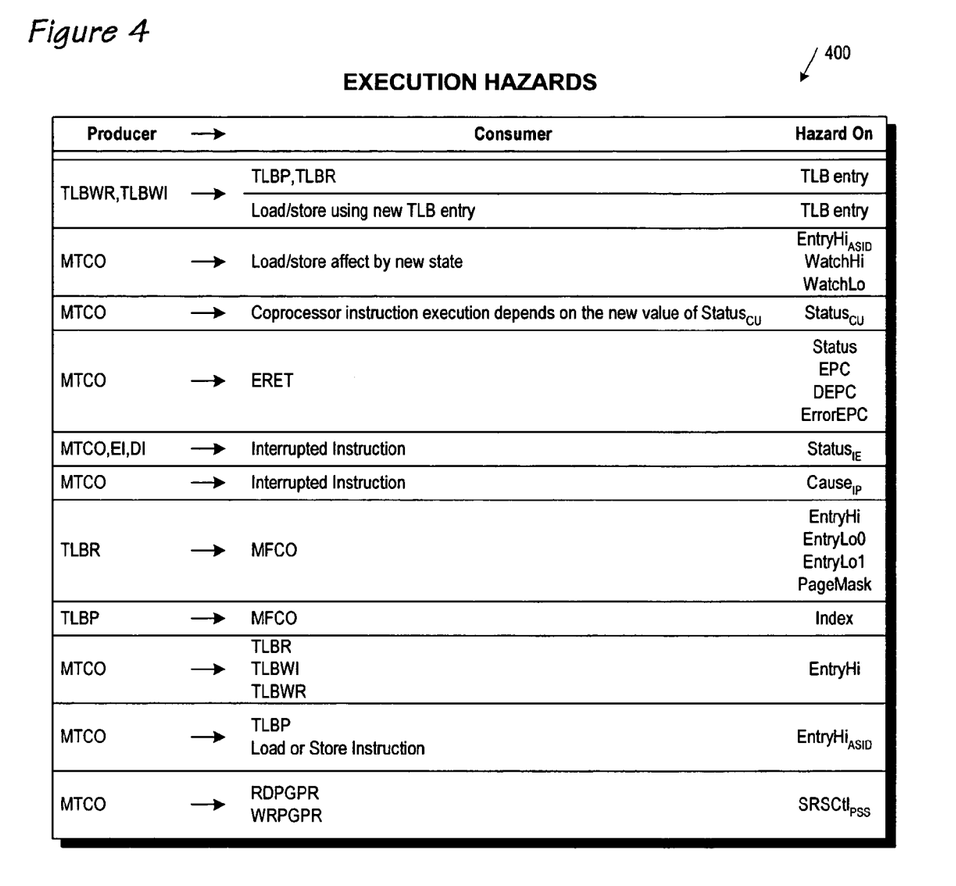
FIG. 4 is a table listing instruction hazards within a MIPS32 architecture.

Execution hazards are those created by the execution of one instruction, and seen by the execution of another instruction. FIG. 4 provides a list of execution hazards within the MIPS32 architecture. The "Producer" is an instruction within a program that when executed, creates a hazard for a following instruction—the "Consumer". For a complete description of each of the instructions listed, the reader is referred to the MIPS32 Architecture for Programmers Volume II: The MIPS32 Instruction Set, available at www.mips.com. One skilled in the art will appreciate that most of the execution hazards are created when a move to/from CoProcessor 0 (the portion of the MIPS processor that supports a virtual memory system, handles exceptions, etc.) is made.

Instruction Hazards

Figure 5:
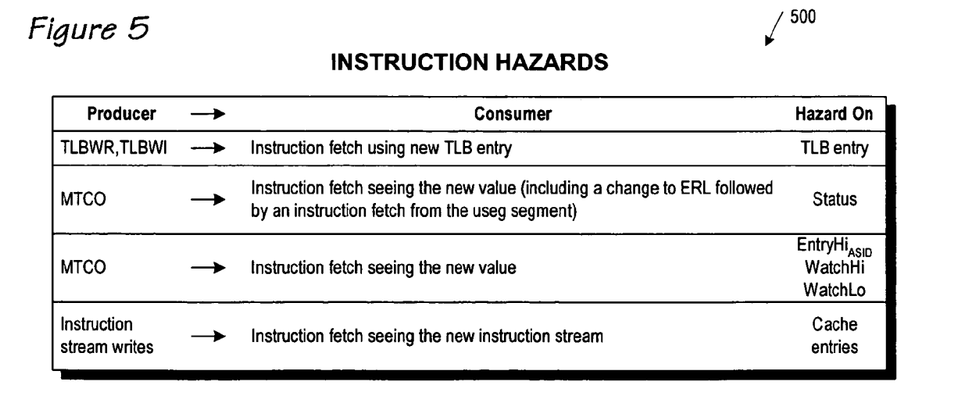
FIG. 5 is a table listing instruction hazards within a MIPS32 architecture.

Instruction hazards are those created by the execution of one instruction, and seen by the instruction fetch of another instruction. FIG. 5 provides a list of instruction hazards within the MIPS32 architecture. A description of these instructions may also be found in the MIPS32 Architecture for Programmers Volume II: The MIPS32 Instruction Set.

Hazard Barrier Jump Instructions

In MIPS32 architecture microprocessors, programmers have been required to insert NOP (SSNOP) instructions between a producer instruction and a consumer instruction, such as those listed in FIGS. 4 and 5 to overcome hazards between the instructions. And, the number of NOPs required depended, as described in the Background above, on the number of stages in the microprocessor, on the spacing between the Producer and Consumer, and on the stage in which the Producer instruction was resolved.

Figure 6:
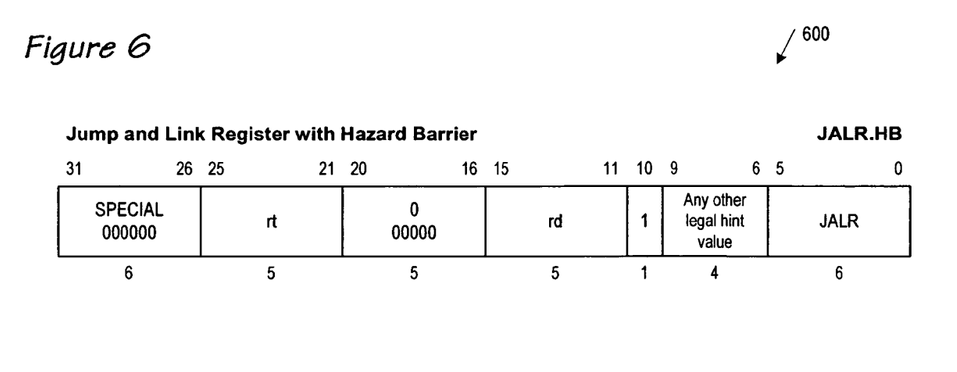
FIG. 6 is a jump instruction within the MIPS32 architecture that is overlaid with a hazard clearing indicator.

Referring now to FIG. 6, a first new instruction, JALR.HB 600 is introduced which overlays a hazard clearing indicator with a jump instruction. One skilled in the art will appreciate that for the purposes of this invention, branches and jumps are equivalent in terms of the implications of this instruction. This new 32-bit instruction will now be described.

The JALR.HB instruction is encoded using bit 10 of the hint field of the previous JALR instruction. This encoding was chosen for compatibility with existing MIPS implementations, including many which pre-date the MIPS32 architecture. The purpose of the JALR.HB instruction is to execute a procedure call to an instruction address in a register, and to clear all execution and instruction hazards as part of the procedure call. The format of the instruction is JALR.HB rs (rd=31 implied), or JALR.HB rd, rs. When this instruction is executed, the return address (return_addr) is stored in the general purpose register rd, and the value specified in the rs register is stored into the program counter (PC). Within the MIPS32 architecture, the return address is the address of the second instruction following the JALR.HB instruction. In addition, with a value of "1" in bit position 10, the JALR.HB instruction also clears all execution and instruction hazards.

More specifically, the JALR.HB instruction implements a software barrier that resolves all execution and instruction hazards created by Coprocessor 0 state changes. The effects of this barrier are seen starting with the instruction fetch and decode of the instruction at the target address to which the JALR.HB instruction jumps.

The JALR.HB instruction, and its effects on hazard clearing, may be implemented in a number of ways. The below discussion provides a description of two embodiments of the invention. In one embodiment, a processor, when seeing the JALR.HB instruction, stalls issue of further instructions for n-cycles until all earlier Coprocessor 0 instructions have completed execution, including update of Coprocessor 0 states that affect the instruction immediately following JALR.HB. The number of cycles that the processor is stalled depends on the length of the pipeline into which the present invention is incorporated. In a second embodiment, the hazard indicator is used to temporarily disable branch prediction mechanisms, instruction fetching, etc., that would otherwise alter sequential program execution. That is, the hazard indicator causes the processor to forego instruction fetching from a predicted target address associated with the jump. Instead, the processor continues its instruction fetching, ultimately flushing the pipeline when the JALR.HB instruction completes execution.

Figure 7:
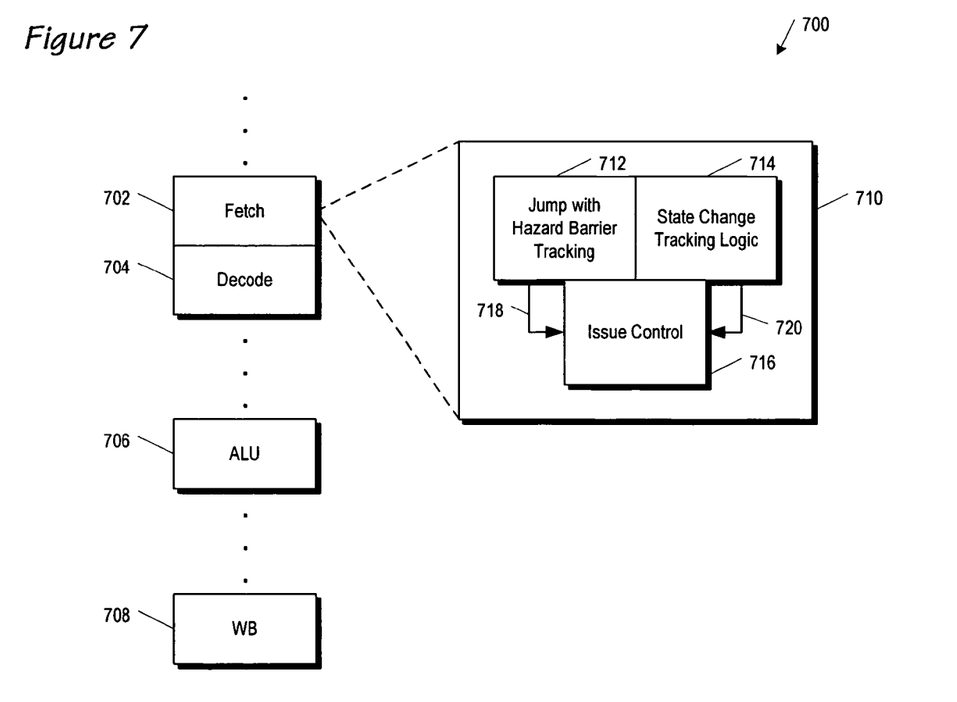
FIG. 7 is a block diagram of a pipelined microprocessor incorporating the hazard clearing mechanism according to an embodiment of the present invention.

Referring now to FIG. 7, a block diagram is shown of a pipeline microprocessor 700 that incorporates aspects of the hazard clearing invention. The processor 700 includes an N-deep pipeline that includes a fetch stage 702 for fetching instructions, a decode stage 704 for decoding the fetched instructions, an ALU stage 706 for performing logical and arithmetic operations, and a write back stage 708 for writing results either to memory, or to registers within the processor 700. One skilled in the art will appreciate that other stages may exist which either precede the fetch stage 702, or follow the fetch, decode, or ALU stages 702, 704, 706, respectively.

The stages shown within the processor 700 are merely representative of some of the stages within modern deeply pipelined microprocessors, as they provide a context for better understanding the present invention.

In one embodiment, hazard clearing logic 710 is located within the fetch stage 702 of the processor 700. Other embodiments might place the hazard clearing logic 710 in other stages of the processor 700, such as after the fetch stage 702. The hazard clearing logic 710 includes: Jump with Hazard Barrier Tracking Logic 712; State Change Tracking logic 714; and Issue Control 716. Operation of the hazard clearing logic 710 is described with reference to the following instruction sequence, particularly the last two instructions of the sequence:

| Opcode | Operands | Comments |
| --- | --- | --- |
| mfc0 | v0,C0_EntryHi | Read current ASID |
| li | v1,-M_EntryHiASID | Get negative mask for field |
| and | v0,v0,v1 | Clear out current ASID value |
| or | v0,v0,a0 | OR in new ASID value |
| mtc0 | v0,C0_EntryHi | Rewrite EntryHi with new ASID |
| jalr.hb | a1 | Call routine, clearing the hazard |
| nop | | |

The above sequence is used to modify ASID within Coprocessor 0, and then call a routine with the new mapping established. The new ASID is stored in register a0 and is used to address the routine to be called.

After the new ASID value replaces the existing ASID value, the instruction MTC0 is fetched into the fetch stage 702 of the processor 700. The MTC0 instruction moves the new value of ASID into a Coprocessor 0 register. While the MTC0 instruction is in the fetch stage 702, the State Change tracking logic 714 detects the MTC0 instruction, and notes that this instruction is of a type that will change the state of the processor 700 in such a way as to create a hazard for a consuming instruction. The stage change tracking logic 714 understands how many cycles it will take for the MTC0 instruction to complete execution, and monitors subsequent clock cycles to "track" the MTC0 instruction until it can mark the instruction as complete. One skilled in the art will appreciate that a number of alternative embodiments may be used to detect and track Producer type instructions through the N-stage pipeline of the processor 700.

During a second clock cycle, the instruction MTC0 proceeds to the next stage in the pipeline, and the instruction JALR.HB is fetched. At this point, the Jump with Hazard Barrier Tracking logic 712 detects this instruction. The Jump with Hazard Barrier Tracking logic is coupled to the State Change Tracking logic to determine whether, at the time the JALR.HB instruction is detected; one or more instructions are still in the pipeline that will affect the state of the processor 700. If so, then the jump with hazard barrier tracking logic 712 (or alternatively the state change tracking logic 714) causes Issue Control logic 716 to stall the JALR.HB instruction until preceding instructions that change the state of the processor 700 have completed. When such instructions complete, the issue control 716 releases the JALR.HB instruction and allows it to proceed down the pipeline, along with the following instructions. If the jump with hazard barrier tracking logic 712 signals the issue control logic 716, it does so by providing a stall indication signal to said issue control using signal line 718. The issue control logic 716 then stalls issuance of the JALR.HB instruction for n-cycles. If the state change tracking logic 714 signals the issue control 716, it does so on signal line 720.

In one embodiment, the issue control 716 automatically stalls the JALR.HB instruction for n-cycles, upon receipt of a stall indication signal. In an alternative embodiment, the issue control 716 only stalls the JALR.HB instruction when it receives both a stall indication signal 718, and a signal from the state change tracking logic on signal line 720. Thus, when the state change tracking logic 714 determines that all hazards have been cleared, it stops signaling the issue control 716, thereby allowing the JALR.HB instruction to proceed. In yet another embodiment, the signal from the state change tracking logic is used to disable the effect of the stall indication signal from the hazard barrier tracking logic 712 when all hazard creating instructions have cleared.

It should be appreciated that without the indication in the JALR.HB instruction to clear any outstanding hazards, the instruction following the nop, presumably the first instruction in the sequence jumped to by the JALR.HB instruction, would execute incorrectly. Alternatively, N-number of NOPs would have had to be placed between the MTC0 instruction and the JALR instruction (or in the first several instruction spaces in the new routine) to insure proper execution. But, by overlaying a clear hazard indicator with the jump instruction, the present invention has allowed a programmer to insure hazards are cleared, without specific knowledge of the pipeline stages within the processor 700, or the particular hazards created by the MTC0 instruction.

Figure 8:
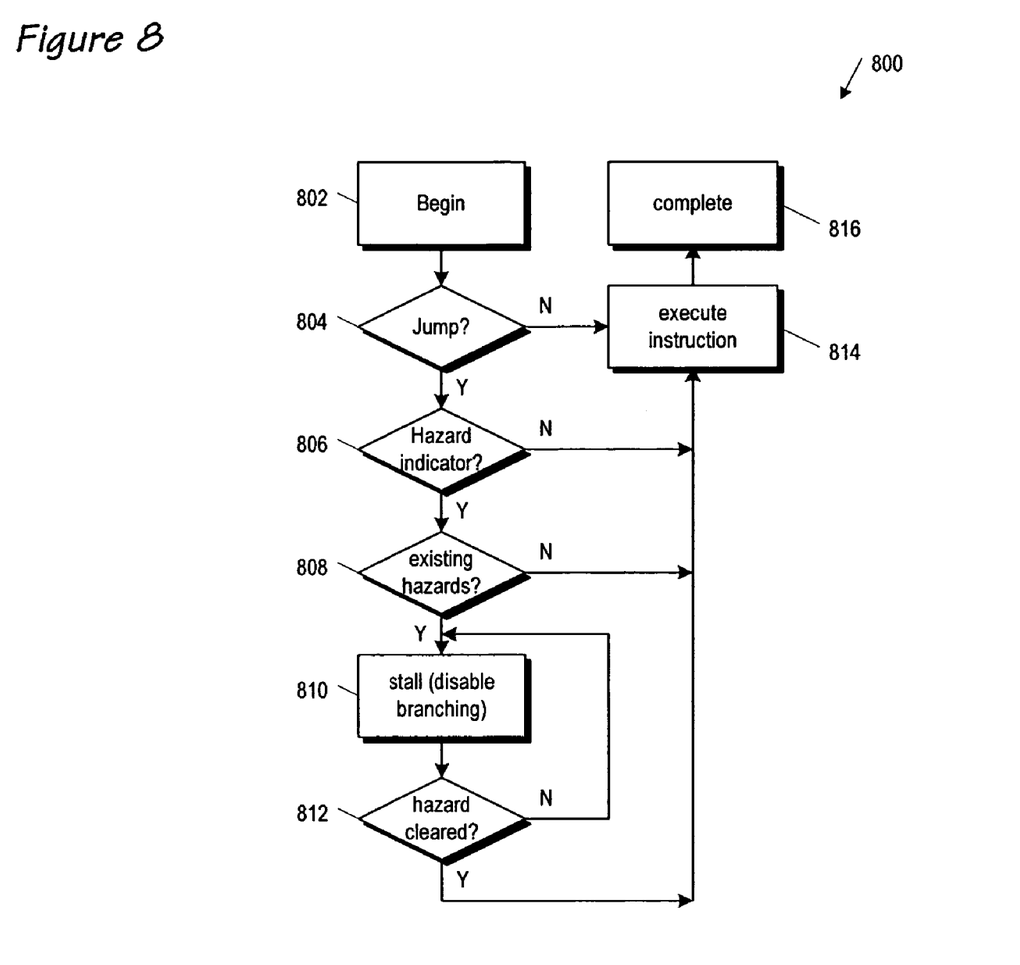
FIG. 8 is a flow chart illustrating the methodology of overlaying a jump instruction with hazard clearing according to the present invention.

Referring now to FIG. 8, a flow chart is shown that illustrates the methodology of clearing hazards according to the present invention. Flow begins at block 802 and proceeds to decision block 804.

At decision block 804, a determination is made as to whether a jump instruction is to be executed. If not, flow proceeds to block 814 where the instruction is allowed to proceed down the pipeline to execute. When the instruction has executed, flow proceeds to block 816. At block 816, the instruction has completed execution. However, if a jump instruction is to be executed, flow proceeds to decision block 806.

At decision block 806, a determination is made as to whether the jump instruction includes a hazard barrier indicator. If not, flow proceeds to block 814 where the jump instruction is allowed to proceed down the pipeline to execute as described above. However, if the jump instruction does contain a hazard barrier indicator, flow proceeds to decision block 808.

At decision block 808, a determination is made as to whether any hazard producing instructions that preceded the jump instruction are still executing in the processor. If not, flow proceeds to block 814 where the jump instruction with hazard indicator is allowed to proceed down the pipeline to execute. However, if any hazard producing instructions are still executing in the pipeline, flow proceeds to block 810.

At block 810, the jump instruction with hazard indicator is stalled for a clock cycle. Flow then proceeds to decision block 812. Note: block 810 may disable branch prediction when used in conjunction with the embodiment described with reference to FIG. 9 below.

At decision block 812, a determination is made as to whether any hazard producing instructions are still executing in the processor. If not, flow proceeds to block 814 where the jump instruction with hazard indicator is allowed to proceed down the pipeline to execute. However, if any hazard producing instructions are still executing in the pipeline, flow proceeds back to block 810. Flow continues between block 810 and decision block 812 until all hazard producing instructions in the pipeline have completed execution. Once all hazard producing instructions have completed execution, the jump instruction with hazard indicator is allowed to proceed down the pipeline.

In an alternative embodiment, rather than stalling the jump instruction with hazard indicator until all hazard producing instructions have completed execution, the inventors recognized that if they simply allow the jump instruction to proceed down the pipeline, that when the processor actually takes the jump specified by the instruction, all other stages following the jump will be flushed, as part of the jump, and execution of instructions following the jump will begin. If the jump is taken in one of the later stages in the pipeline, by the time it is taken, all hazard producing instructions will have completed execution. And, since all instructions that follow the jump are flushed, as a result of the jump, no instruction that should execute will have had time to begin execution using an incorrect state.

A problem with this approach, however, is that most modern processors, especially deeply pipelined microprocessors, utilize branch prediction mechanisms to predict the target address for the jump and begin fetching and executing instructions from the predicted target address, long before the jump instruction actually executes. A discussion of such branch prediction mechanisms is beyond the scope of this discussion. However, it should be appreciated that such mechanisms are designed to eliminate the delay associated with flushing the pipeline prior to fetching instructions at the new target address. However, if such branch prediction mechanisms are used in conjunction with a jump instruction with hazard indicator, the desired result (a flush of the pipeline) will not occur. Therefore, the inventors of the present invention utilize the hazard indicator within the jump instruction of the present invention to effectively disable instruction fetching related to a predicted target address, during the execution of the jump instruction with hazard indicator. Such an embodiment is shown in FIG. 9 to which attention is now directed.

Figure 9:
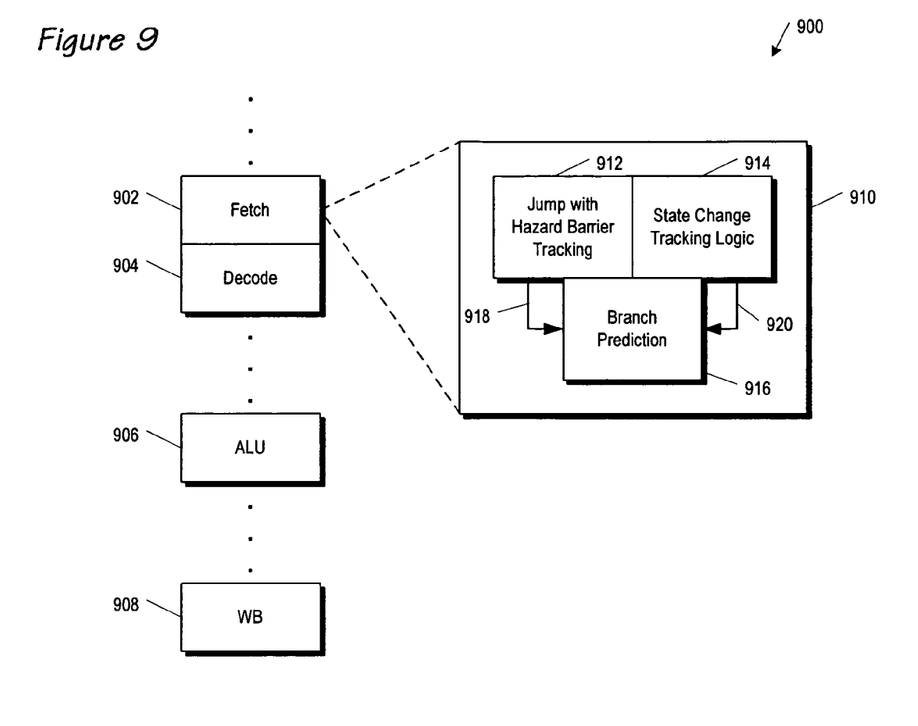
FIG. 9 is a block diagram of a pipelined microprocessor incorporating the hazard clearing mechanism according to an alternative embodiment of the present invention.

FIG. 9 shows a pipelined microprocessor 900 similar to the one described with reference to FIG. 7. Like numbers have like references, the hundreds digit being replaced with a 9. A description of the operation of the processor 900 will now be provided using the instruction sequence provided above with reference to FIG. 7.

During a first clock cycle, an MTC0 instruction is fetched. The state change tracking logic 914 detects the MTC0 instruction as being of a type that can produce a hazard for subsequent instructions.

During a second clock cycle, the JALR.HB instruction is fetched. The jump with hazard barrier tracking logic 912 detects this instruction as a jump instruction that also wishes to clear any previous hazards. If the jump instruction did not indicate that hazards are to be cleared, the branch prediction logic 916 would cause the program counter of the processor 900 to begin fetching instructions from the predicted target address. Thus, the instructions following the jump instructions in the pipeline of the processor 900 would be the new instruction stream associated with the predicted target address, rather than the instructions that follow the jump instruction sequentially in memory. As mentioned above, normally this would be a benefit.

However, if the programmer wishes to insure that hazards are cleared as part of the jump, s/he utilizes the jump instruction with hazard clearing indicator. The jump with hazard barrier tracking logic 912 detects this desire, and if the state change tracking logic 914 indicates that a hazard producing instruction is still executing, disables the branch prediction logic 916 for the present jump. The jump is then allowed to proceed down the pipeline, followed by instructions that will ultimately be flushed out of the pipe when the jump is executed. And, as mentioned above, by the time the jump is finally executed, and the pipeline is flushed, all hazards created by the MTC0 instruction will have been cleared.

At this point, one skilled in the art should appreciate that the present invention, as described with reference to FIGS. 7-9, need not utilize the state change tracking logic 714, 914. Rather, the jump with hazard barrier tracking 712, 912 could alone specify a stall of N cycles (with reference to FIG. 7), or could disable branch prediction 916 (with reference to FIG. 9), irrespective of whether a previous instruction created a hazard. That is, where state change tracking logic is not implemented, the jump with hazard barrier tracking logic will cause the issue control to stall for n-cycles, or the branch prediction to be disabled for the present jump instruction without regard to whether hazards are presently in the pipeline of the processor. Such an embodiment would simplify implementation of the present invention, and would not require the hardware associated with tracking of hazard producing instructions. However, utilization of the state change tracking logic 714, 914 optimizes the present invention to only have effect if a hazard producing instruction is executing. Otherwise, the hazard barrier indicator will execute just like a jump instruction without a hazard barrier indicator.

Figure 10:
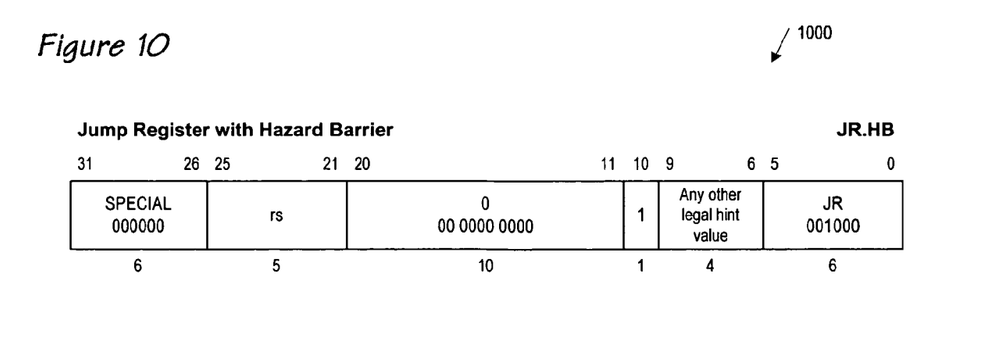
FIG. 10 is another jump instruction within the MIPS32 architecture that is overlaid with a hazard clearing indicator.

Referring now to FIG. 10, a block diagram 1000 is shown of an additional instruction JR.HB for overlaying hazard clearing with a jump instruction. The JR.HB instruction is of the form JR.HB rs, and executes a branch to an instruction address specified in a register rs, and clears all execution and instruction hazards. The JR.HB instruction operates exactly like the JALR.HB instruction described above. However, rather than automatically specifying a return link address (as in the JALR.HB instruction), the programmer is given the option of specifying his own return address using another JR.HB instruction.

The above description with reference to FIGS. 4-10 have illustrated alternative embodiments and a method for overlaying a hazard clearing indicator with a jump operation. Although the present invention and its objects, features, and advantages have been described in detail, other embodiments are encompassed by the invention. In addition to implementations of the invention using hardware, the invention can be embodied in computer readable program code (e.g., software) disposed, for example, in a computer usable (e.g., readable) medium configured to store the code. The code causes the enablement of the functions, fabrication, modeling, simulation and/or testing, of the invention disclosed herein. For example, this can be accomplished through the use of computer readable program code in the form of general programming languages (e.g., C, C++, etc.), GDSII, hardware description languages (HDL) including Verilog HDL, VHDL, AHDL (Altera Hardware Description Language) and so on, or other databases, programming and/or circuit (i.e., schematic) capture tools available in the art. The code can be disposed in any known computer usable medium including semiconductor memory, magnetic disk, optical disc (e.g., CD-ROM, DVD-ROM, etc.) and as a computer data signal embodied in a computer usable (e.g., readable) transmission medium (e.g., carrier wave or any other medium including digital, optical or analog-based medium). As such, the code can be transmitted over communication networks including the Internet and intranets. It is understood that the functions accomplished and/or structure provided by the invention as described above can be represented in a processor that is embodied in code (e.g., HDL, GDSII, etc.) and may be transformed to hardware as part of the production of integrated circuits. Also, the invention may be embodied as a combination of hardware and code.

In addition, one skilled in the art will appreciate that the functional blocks described in FIGS. 7-9, although shown coupled to the Fetch stage of a microprocessor, could be placed together in another stage of the microprocessor, or could alternatively be separated and placed in different processing stages. That is, the Branch Prediction Logic could be located within a Fetch stage of a processor, while the jump with hazard barrier tracking could be located in a Decode stage of a processor. What is important is that the jump with hazard barrier tracking logic is able to implement the functionality of hazard clearing as part of the jump operation, as has been described above.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A computer program product comprising a computer readable storage medium having encoded thereon computer program code to describe a processor capable of executing a jump with hazard barrier instruction, the jump with hazard barrier instruction comprising:
   an opcode field specifying a jump to a target address operation;
   a first register field, specifying a first register that contains a value used to determine said target address;
   a second register field, specifying a second register to contain a value used to determine a return address; and
   a hazard barrier hint field, for designating that instruction hazards are required to be cleared as part of execution of the jump with hazard barrier instruction.

2. The computer program product of claim 1, wherein use of the jump with hazard barrier instruction on a pipelined microprocessor causes instruction hazards to be cleared as part of the jump with hazard barrier operation wherein no no-operation instructions (NOP's) are executed during execution of the jump with hazard barrier instruction.

3. The computer program product of claim 1, wherein the jump with hazard barrier instruction resolves all execution and instruction hazards existing within the microprocessor at the time of execution of the jump with hazard barrier instruction.

4. The computer program product of claim 1, wherein the jump with hazard barrier instruction stalls issue of further instructions until existing hazards within the microprocessor have cleared.

5. The computer program product of claim 4, wherein the number of cycles that the processor is stalled depends on the number of stages in the microprocessor.

6. The computer program product of claim 1, wherein the jump with hazard barrier instruction temporarily disables mechanisms that would otherwise alter sequential program execution.

7. The computer program product of claim 6, wherein said mechanisms comprise branch prediction mechanisms.

8. The computer program product of claim 6, wherein said mechanisms comprise instruction fetching mechanisms.

9. The computer program product of claim 6, wherein said mechanisms are disabled until the jump with hazard barrier instruction completes execution.

10. The computer program product of claim 1, wherein the jump with hazard barrier instruction executes a procedure call to said target address and clears all execution and instruction hazards as part of the procedure call.

11. The computer program product of claim 10, wherein said return address is stored in a general purpose register specified by said second register field.

12. The computer program product of claim 10, wherein the value specified by said first register is stored into a program counter in the processor.

13. The computer program product of claim 1, wherein after the processor fetches the jump with hazard barrier instruction, the jump with hazard barrier instruction is stalled until preceding instructions that create hazards have completed execution.

14. The computer program product of claim 13, wherein if no hazards exist from preceding instructions, the jump with hazard barrier instruction is not stalled.

15. A computer program product comprising a computer readable storage medium having encoded thereon computer program code to describe a processor capable of executing a jump with hazard barrier instruction, the jump with hazard barrier instruction comprising:
   an opcode field, specifying a jump to a target address operation;
   a register field, specifying a first register that contains a value used to determine said target address; and
   a hazard barrier hint field, designating that instruction hazards are required to be cleared as part of execution of the jump with hazard barrier instruction,
   wherein a return address register for the return address defined in the format of the jump with hazard barrier instruction.

16. The computer program product of claim 15, wherein said return address register is 31.

17. A computer program product comprising a computer readable storage medium having encoded thereon computer program code to describe a processor capable of executing a jump with hazard clearing instruction, the jump with hazard clearing instruction comprising:
   an opcode field specifying a jump to a target address operation;
   a register field specifying a register that contains a value used to determine said target address; and
   a hazard barrier field designating that instruction hazards are required to be cleared as part of execution of the jump with hazard clearing instruction.

18. The computer program product of claim 17, wherein the jump with hazard clearing instruction does not specify a return address.

19. The computer program product of claim 18, wherein said return address is designated as a target address in a following jump instruction.

20. The computer program product of claim 17, wherein the jump with hazard clearing instruction stalls issue of further instructions until existing hazards within the microprocessor have cleared.

21. The computer program product of claim 17, wherein the jump with hazard clearing instruction temporarily disables mechanisms that would otherwise alter sequential program execution.

22. The computer program product of claim 21, wherein said mechanisms comprise branch prediction mechanisms.

23. The computer program product of claim 21, wherein said mechanisms comprise instruction fetching mechanisms.

24. A method for providing a jump instruction with hazard clearing, the method comprising:
providing computer-readable program code describing the jump instruction with hazard clearing, the program code comprising:
first program code for describing an opcode field, the opcode field specifying a jump to target address operation;
second program code for describing a register field, the register field specifying a register that contains a value used to determine a target address; and
third program code for describing a hazard barrier hint field, said field designating that instruction hazards are required to be cleared as part of execution of the jump instruction; and
transmitting the computer-readable program code as a computer data signal on a network.

25. The method as recited in claim 24, wherein the jump with hazard barrier instruction resolves all execution and instruction hazards existing within the microprocessor at the time of execution of the jump with hazard barrier instruction.

26. The method in claim 24 wherein the jump with hazard barrier instruction stalls issue of further instructions until existing hazards within the microprocessor have cleared.

27. The method as recited in claim 24, wherein the jump with hazard barrier instruction temporarily disables mechanisms that would otherwise alter sequential program execution.

28. The method as recited in claim 27, wherein said mechanisms comprise branch prediction mechanisms and instruction fetching mechanisms.

29. The method as recited in claim 24, wherein the computer readable program code further comprises fourth program code for describing a second register field, the second register field specifying a second register to contain a value used to determine a return address.

30. The method as recited in claim 24, wherein a value for a return address is predetermined.

31. The method in claim 30, wherein the predetermined value for the return address is 31.

32. A hardware microprocessor comprising:
issue control logic, wherein said issue control logic is configured to:
issue instructions to be executed by the microprocessor; and
stall issuance of instructions responsive to a stall indication signal; and
jump with hazard barrier tracking logic, wherein said tracking logic is configured to provide the stall indication signal to said issue control logic in response to determining instruction hazards are required to be cleared as part of an execution of a jump instruction where one or more instructions in a pipeline to be executed by the microprocessor will affect the state of the microprocessor,
wherein in response to the stall indication signal, the issue control logic is configured to stall issuance of instructions for a number of cycles required to clear all instruction hazards within the microprocessor.

33. The hardware microprocessor as recited in claim 32, wherein the instruction hazards are hazards created by execution of a producer instruction and seen by execution of a consumer of the producer instruction.

34. The hardware microprocessor in claim 32, wherein the jump instruction comprises a field for designating whether instruction hazards are to be cleared.

35. A method for hazard clearing during operation of a pipelined microprocessor, the method comprising:
determining whether a first jump instruction to be executed requires all existing hazards to be cleared as part of its execution;
stalling the first instruction in response to said determining if at least one hazard producing instruction is present in a pipeline of the microprocessor; and
resuming execution of the first jump instruction after all of the at least one hazard producing instruction completes execution.

36. The method of claim 35 wherein said stalling is responsive to determining said at least one hazard producing instruction precedes the first jump instruction in the pipeline.

37. The method of claim 36 wherein stalling the first jump instruction comprises stalling the first instruction for at least one clock cycle in response to a signal generated by state change tracking logic.

38. The method of claim 36 wherein stalling the first jump instruction further comprises stalling the first instruction in response to a stall indication signal.

39. The method of claim 38 wherein a hazard indicator indicates that hazards are to be cleared prior to executing the first jump instruction.

40. The method of claim 35 wherein a hazard indicator indicates that hazards are to be cleared prior to executing the first jump instruction.

41. The method of claim 35 wherein the instruction is a JALR.HB instruction.

42. The method of claim 35 wherein the instruction is a JR.HB instruction.

43. The method of claim 35, wherein said first instruction comprises a jump instruction, and wherein the method further comprises predicting a target address prior to execution of the first instruction only if no hazard producing instructions are in the pipeline.

44. A method for hazard clearing during operation of a pipeline microprocessor, the method comprising:
determining whether a first instruction can produce a hazard for a subsequent control transfer instruction;
in response to a determination the first instruction can produce a hazard for a subsequent control transfer instruction, disabling branch prediction logic for the subsequent control transfer instruction if the first instruction is in the pipeline and has not completed; and
flushing instructions that follow the subsequent control transfer instruction from the pipeline upon completion of the subsequent control transfer instruction,
wherein the subsequent instruction indicates that hazards are to be cleared prior to execution, and branch prediction and instruction fetching are to be disabled, only if all hazard producing instructions precede the subsequent instruction in the pipeline.

45. The method of claim 44 wherein the subsequent instruction is a jump instruction having a hazard clearing indicator.

46. The method of claim 44 wherein the subsequent instruction initiates a software barrier that resolves execution and instruction hazards and disables instruction fetching.

47. A method for hazard clearing during operation of a pipeline microprocessor, the method comprising:
determining whether a first jump instruction indicates that hazards are required to be cleared as part of executing the first jump instruction; and
initiating a barrier that compensates for the possibility that at least one hazard producing instruction is in the pipeline and is still executing, wherein the first jump instruction indicates that hazards are to be cleared prior to execution, and that branch prediction and instruction fetching are to be disabled, only if all existing hazard producing instructions precede the first jump instruction in the pipeline.

48. The method of claim 47 wherein the barrier disables branch prediction logic and flushes instructions that follow the first jump instruction upon execution of the first instruction.

49. The method of claim 47 wherein the first jump instruction is a jump instruction having a hazard clearing indicator, and wherein the first jump instruction initiates a software barrier that resolves execution and instruction hazards by disabling branch prediction and instruction fetching.

50. A hardware pipelined microprocessor configured to clear instruction hazards in conjunction with performing a jump instruction, the pipelined microprocessor comprising:

prediction logic for predicting a target address prior to completing the jump instruction;

a decoder for determining if the jump instruction indicates that hazards are required to be cleared;

signaling logic for signaling branch prediction logic to alter execution of the jump instruction if preceding instructions executing within the pipelined microprocessor will produce hazards, and a software barrier to resolve all existing hazards by stalling the issuance of the instruction.

51. The hardware pipelined microprocessor of claim 50, further comprising a software barrier to resolve hazards by disabling branch prediction and instruction fetching.

* * * * *